Feb. 14, 1961 S. C. ROCKAFELLOW 2,971,263
ELECTRICAL DEVICE
Filed April 30, 1958 2 Sheets-Sheet 1

INVENTOR.
STUART C. ROCKAFELLOW
BY
Woodhams, Blanchard & Flynn
ATTORNEYS

Feb. 14, 1961 S. C. ROCKAFELLOW 2,971,263
ELECTRICAL DEVICE
Filed April 30, 1958 2 Sheets-Sheet 2
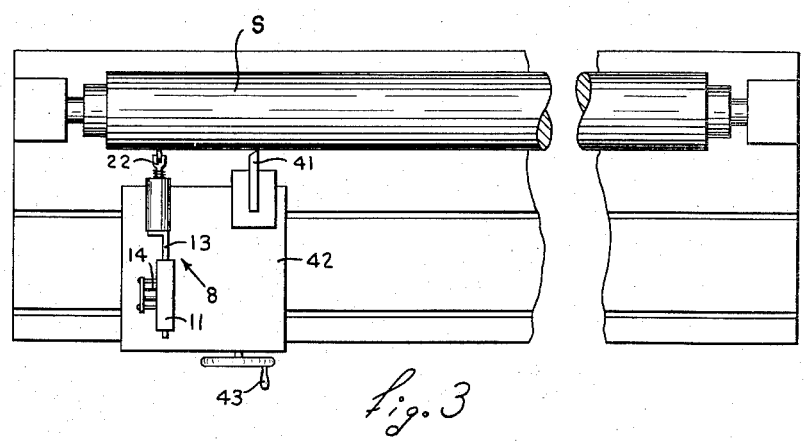
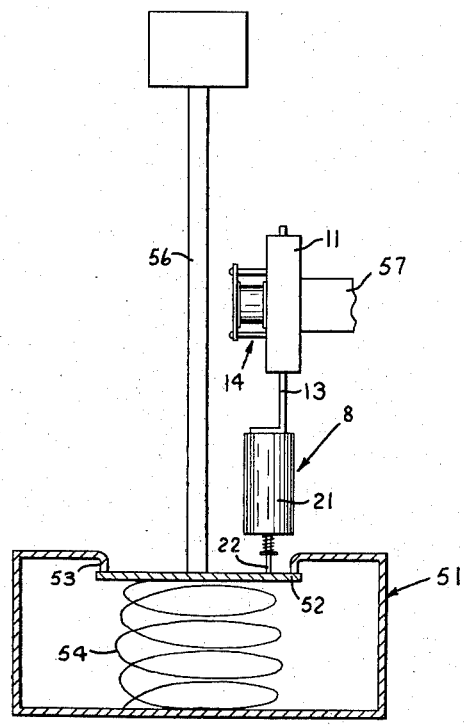
INVENTOR.
STUART C. ROCKAFELLOW
BY
Woodhams, Blanchard & Flynn
ATTORNEYS

United States Patent Office 2,971,263
Patented Feb. 14, 1961

2,971,263

ELECTRICAL DEVICE

Stuart C. Rockafellow, Plymouth, Mich., assignor to Robotron Corporation, Detroit, Mich., a corporation of Michigan Filed Apr. 30, 1958, Ser. No. 732,073

3 Claims. (Cl. 33—172)

This invention relates to an indicating instrument and, more particularly, relates to a measuring and indicating instrument adapted for use with a machine tool which may be positioned at a predetermined location and which will thereafter indicate any change in the distance between the work on which the machine tool operates and said predetermined location.

In a wide variety of machine tools such as in grinders and lathes where extremely high precision is required, it is often difficult, in view of the tolerances to which such machines are necessarily built, to set the machine at a zero point with respect to the work and thereafter indicate with sufficient accuracy the distance between the zero point and the work as the machining, grinding or similar operation progresses to thereby determine the change in a dimension or position of the work resulting from such operation. Particularly, in any mechanical indicator which may be used for indicating the relative position of a machine and the work, the mechanical tolerances, as well as the slack normally built into even high grade machine tools, will result in slight inaccuracies in the indication of such relative position. Accordingly, for high precision work it is not possible to rely upon such indicators for determining and controlling the relative movement of the machine and the work. Previous attempts to overcome this problem by building machine tools to extremely close tolerances and/or by using various types of closely controlled manual or automatic feeding devices have lessened the problem somewhat but have not eliminated it particularly where extremely high precision work is involved. Further, even if means are provided for compensating for tolerance and/or slack in one positional setting of the cutting or similar tool of the machine in question, this compensation is not necessarily accurate for another positional setting of the tool inasmuch as the error in the machine itself will vary in amount from one setting to another thereof.

Where machining operations are done on individual basis, this problem has not caused unreasonable difficulties since the work can be, and normally is, frequently measured during a single machining operation. However, where machining operations are carried on automatically, and/or with mechanical feeding of the work, then it becomes highly desirable to provide an indicating device capable of being automatically set in a zero reference position for each operation. Further such a device should provide an output readable either visually or in terms of an electrical value so that accomplishment of a certain amount of change in position or dimension of the work will be indicated. Moreover, it is desirable that such a device should provide an output capable of automatically effecting separation of the workpiece from the tool when the desired change in dimension or position has been completed.

Accordingly, the major objects of the invention are:

(1) To provide an indicating device which can be set at a zero reference point for each machining or similar operation quickly, conveniently and by automatically operable means;

(2) To provide an indicating device, as aforesaid, which will require only straight-line motion to effect such setting at a zero reference point whereby the device can be carried on the work-feeding part of a machine tool, such as the cross-feed of a lathe or the table of a grinder;

(3) To provide an indicating device, as aforesaid, in which the zero reference indicator will be moved into a desired position with respect to a given workpiece and held in such position by electrically actuable means;

(4) To provide an indicating device, as aforesaid, which will produce an electrical potential as the work moves away from zero reference position in a normal course of operation of the machine tool, which electrical potential can then be utilized for whatever purposes are desired, such as actuating an indicating meter or when the potential reaches a predetermined level, actuating means for withdrawing the work from the machine;

(5) To provide an indicating device, as aforesaid, which is sufficiently simple that it can be manufactured, installed, and maintained in effective operating condition relatively inexpensively;

(6) To provide an indicating device, as aforesaid, which can readily be applied to a wide variety of presently existing machine tools; and (7) To provide apparatus, as aforesaid, which while developed primarily for application to machine tools, is also readily applicable to a wide variety of other types of equipment where it is desired to first establish a zero point and then to measure a changing distance between said zero point and an object.

Other objects and purposes of the invention will be apparent to persons acquainted with devices of this general type upon reading the following disclosure and inspection of the accompanying drawings.

In the drawings:

Figure 3 is a top, somewhat schematic, view of a different type of machine on which the indicating device may be used.

Figure 4 is a sectional, somewhat schematic, view showing a further use of the indicating device.

General description

In general, the invention provides an indicating device including a feeler which is connected to and is movable with respect to a suitable member, such as a transducer, which will convert movement of said feeler into an electrical output proportional to the amount of such movement. The feeler and the member are mounted for movement in a frame and means are provided for releasably locking the feeler and member in fixed position in the frame to establish a zero reference point wherein the electrical output therefrom is a predetermined value, as zero. Thereafter, movement of the feeler with respect to the member will cause said electrical output to vary to thereby provide an indication of the amount of such relative movement.

In a representative use of the invention, the indicating device is slidably mounted on a movable element of the machine tool, such as on the table of a grinder, and said device is caused to abut against a stop which is fixed to the stationary frame of the machine and slide until the zero point is reached. As the device abuts against the stop, the feeler thereon compresses a spring, which spring thereafter holds the feeler against the stop. The indicating device is then magnetically fixed in position on the movable element of the machine tool and is held so until the next cycle of operation. Relative movement between the feeler and the remainder of the indicating device, such as may be caused by movement of the movable element of the machine tool with respect to the stationary frame thereof, is translated into electrical potential by a suitable transducer arrangement and the electrical potential can then be utilized to actuate an indicator for visual control of the machine by the operator, or, in a fully automatic operation, it can be utilized to actuate work retraction mechanism when it attains a predetermined value.

*Detailed description*

Figure 1:
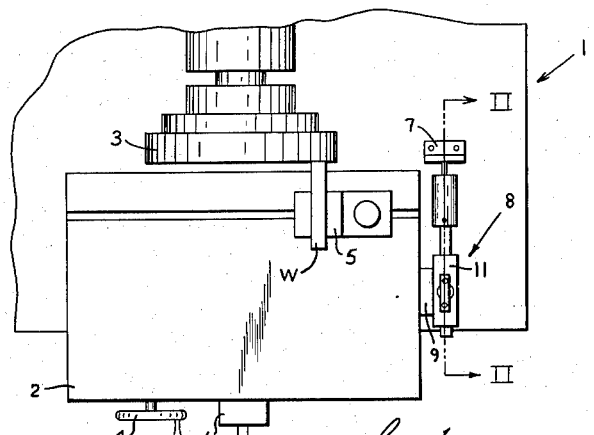
Figure 1 is a top, somewhat schematic, view of the wheel and table of a face-type grinding machine fitted with a device embodying the invention.
Figure 2:
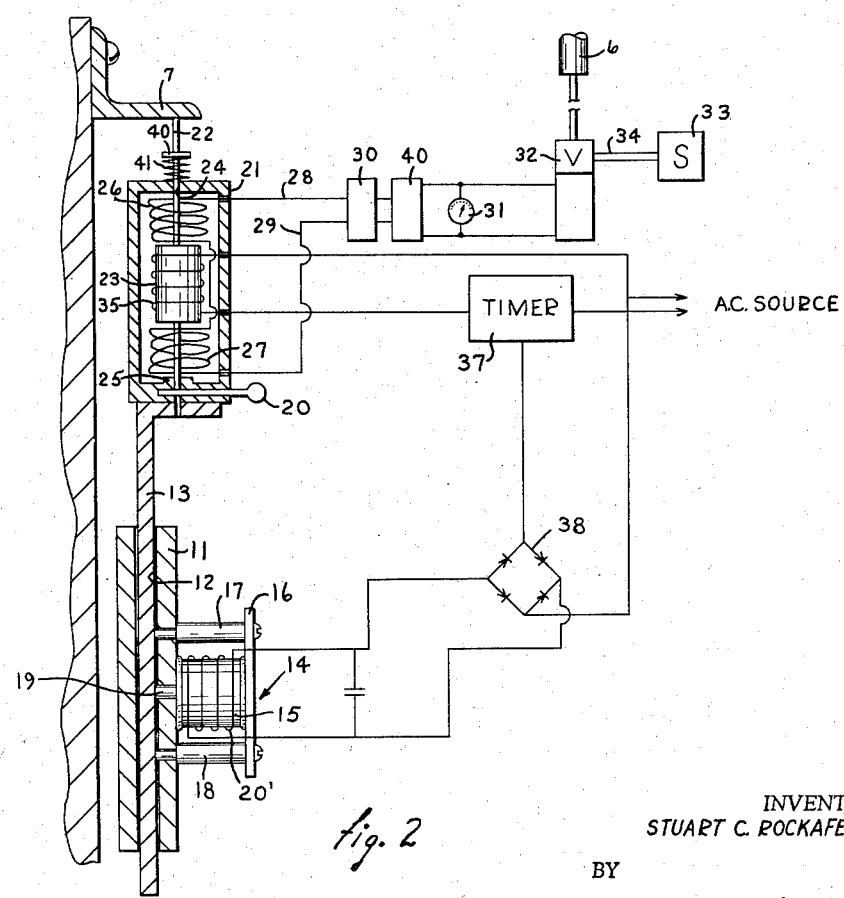
Figure 2 is a sectional view on an enlarged scale taken on the line II—II of Figure 1 with some parts shown somewhat schematically for effecting a clearer disclosure thereof, together with a schematic diagram of the electrical circuit associated therewith.

Turning now to Figures 1 and 2 of the drawing, there is shown somewhat diagrammatically a grinding machine 1 having a reciprocable work-support table 2 and a face-type grinding wheel 3. A hand wheel 4 is provided for manually moving the work-support table toward and away from the grinding wheel. A workholder 5 is mounted on the table 2 for holding the work W in position for engaging the grinding wheel. A work-feeding cylinder 6 may also be provided, if desired, for effecting automatic movement of the table. While the specific control for moving the table toward and away from the grinding wheel forms no part of the present invention, it will be assumed for illustrative purposes that compressed air is applied to the cylinder 6 for moving the table toward the work and the return movement of the table is brought about by a continuously acting spring within said cylinder. An angle member 7 is secured to the stationary frame of the grinding machine to act as a limit or stop device for the indicating device.

The indicating device 8 is fastened by a bracket 9 to the table 2 of the grinder. The bracket 9 moves toward and away from the stop 7 simultaneously with movement of said table 2 and the workpiece W carried thereby toward and away from the grinding wheel 3. The indicating device 8 includes a sleeve 11 of non-magnetic material, such as brass or aluminum, which is fixedly mounted upon the bracket 9 for movement therewith. A slider 13 of magnetizable material, such as soft iron, slidably extends through the longitudinal central opening 12 of the sleeve 11. A D.C. electromagnet 14 is mounted on the sleeve 11 for movement therewith. The core 15 of the electromagnet 14 is energized by winding 20' which is connected to a suitable D.C. source. A yoke 16 connects the magnetizable pole pieces 17 and 18 to one end of the core 15 so that said pole pieces have one polarity when the winding is energized. A further magnetizable pole piece 19 is connected to the other end of the core 15 and is of the opposite polarity. All three pole pieces 17, 18 and 19 extend through suitable openings in the sleeve 11 into the opening 12 and slidingly contact the slider 13 therewithin.

The slider 13 has an enlarged, hollow head 21 connected thereto at one end thereof which head has a feeler 22 mounted thereon. The feeler 22 is an elongated rod which slidably extends through a suitable opening 24 in one end of the head 21 and which is slidably extendible into an opening in the boss 25 at the other end of said head. A blocking pin 20 extends transversely through the opening in boss 25 to limit the movement of the feeler 22 in a direction away from the stop 7. The feeler 22 has a collar 40 between the stop 7 and the end of the head 21 adjacent thereto. A compression spring 41 encircles the feeler 22 between collar 40 and head 21 and urges the feeler against the stop 7.

The portion of the feeler 22 within the head 21 carries any convenient type of position sensitive device for controlling a transducer. In the disclosed embodiment of the invention, the position sensitive device is the core 23 which extends through the central coil 35 of a differential-type transformer. The differential transformer has a pair of windings 26 and 27 positioned at either end of the central coil 35. The adjacent ends of the windings 26 and 27 are connected to each other while the remote ends thereof are connected by conductors 28 and 29 to any suitable comparator circuit 30. The windings 26 and 27 provide outputs which buck each other so that the output of comparator circuit 30 is zero when the windings are equally energized, which occurs when the core 23 is exactly centered therebetween. The length of the feeler is such that when said feeler abuts against pin 20, the core 23 is centered between windings 26 and 27. However, if the core 23 is moved off center by movement of the feeler 22, the voltage output of one winding will increase while the other will decrease and this will provide an output from comparator circuit 30. The output terminals of the comparator circuit are connected to an amplifier 40 and thence to an indicator 31 for giving visual indication of the output thereof. Where automatic operation of the machine tool is being effected, the output terminals of the amplifier are also connected, through a relay (not shown) if desired, to suitable means, such as a solenoid valve 32, for controlling a supply of pressure fluid from a source 33 through a conduit 34 to the cylinder 6.

A source of alternating electrical energy is connected to the central winding 23 of the differential transformer, preferably through a timer 37 by which energization of said winding 23 may be controlled with respect to the operation of the work-feeding table 2. If desired, the A.C. source may be connected to the coil 20' of the electromagnet 14, through timer 37 and a rectifier bridge 38, to apply a substantially steady D.C. potential thereto. Of course, other sources of D.C. potential may be used, if desired.

It will be borne in mind that many specific types of transducer devices may be utilized so that the specific details here shown, together with the circuitry associated therewith, are shown solely for purposes of completeness and illustration and with no intention to limit.

*Operation*

Starting with the table 2 in retracted position, a workpiece W is placed into the workholder 5 and said workholder is arranged on the table 2 in the usual manner. The table 2 is then moved forwardly toward the grinding wheel 3 in the usual manner, either manually or, in this particular embodiment, by fluid pressure, until the feeler 22 strikes the stop 7 and pushes the feeler back against the spring 41. The feeler 22 moves back against the blocking pin 20 and further pushing of said feeler pushes the head 21 and slider 13 backwardly with respect to sleeve 11 and the table 2. During the movement of the head 21 and slider 13 the winding of the magnet 14 may, if desired, be slightly energized to retard, but not block movement of the slider 13 through the sleeve 11. Movement of the table is continued until the table reaches a predetermined position, such as a position wherein the workpiece W just touches the surface of the grinding wheel 3. Thereupon, the timer 37 functions to fully energize the winding of the electromagnet 14 so as to magnetically lock the slider 13 to the sleeve 11 and thereby to the table 2. At this time the spring 41 is compressed and the core 23 is centered between the windings 26 and 27 so that the outputs thereof are balanced and cancel each other out. This is the zero reference position for the indicating device.

The movable stop 20 is then withdrawn, either manually or automatically, as desired, and, since the spring 41 urges the feeler 22 against stop 7, the feeler will remain stationary. When the grinding operation is begun by moving the table 2 toward the grinding wheel, such will cause corresponding movement of sleeve 11, slider 13, head 21 and the windings 26, 27 and 35 therewithin. The core 23 on the feeler will remain stationary.

This will cause the output of winding 27 to increase while the output of winding 26 will decrease and this will effect an unbalance in the potential appearing in the conductors 28 and 29 and will provide an output from the comparator circuit 30 which may be readily read on the meter 31. The delicacy of the transducer is such that by use of the amplifier 40 a displacement of the core 23 of only a few ten-thousandths of an inch, corresponding to an equal amount of movement of the table 2, can readily be read on the meter 31.

Thus, with the zero reference point established as indicated, the meter 31 may be calibrated to provide a direct reading of the amount of movement of the table toward the grinding wheel 30 from the zero reference point and, thus, will show the amount of material which has been removed from the workpiece.

Inasmuch as the output of the comparator circuit will vary in proportion to the displacement of the core 23, such output can be utilized when it reaches a desired maximum value to activate control mechanism, such as the solenoid 32, for the automatic feeding means whereby, when a predetermined movement of the table has been effected, the solenoid 32 will close the valve V to terminate the flow of pressure fluid into the cylinder 6 to permit the retraction of the table. The magnet 14 will then be de-energized in preparation for the next cycle.

Modification

In Figure 3 there is shown a modification wherein the feeler 22 acts directly on the workpiece itself and moves outwardly of the head rather than inwardly as in the previous embodiment. In this embodiment, the workpiece is shown as being a shaft S which is to be machined by a suitable cutting tool 41, which cutting tool travels along the length of a shaft in a known manner. Here the feeler 22 is placed against the surface of the shaft S by movement of the entire indicating device 8 toward said shaft in any convenient manner, such as by moving the table 42 upon which the measuring unit is mounted toward the workpiece by rotation of the hand wheel 43 until the feeler abuts against the pin 20. As before, any further movement of the indicating device will cause the slide 13 to slide within the sleeve 11. After the table 42 and the indicating device 8 have been moved to the desired position, the electromagnet 14 is energized and the slide 13 is magnetically locked into fixed position with respect to the sleeve 11. As before, since the end of the feeler 22 is in firm contact with the blocking pin 20, the core 23 is centered with respect to the other two windings and the meter 31 reads zero. This is the zero reference position. Here, however, as the work proceeds, that is, as the diameter of the shaft S is reduced, the feeler 22 moves outwardly under the influence of the spring 41 to follow same and, thus, the core 23 moves toward the winding 26. This creates an unbalance in the outputs of the windings, which unbalance will energize the meter 31 to provide a reading indicating the amount of movement of the feeler and thereby indicate the amount of material removed from the shaft.

Figure 4 shows still another manner of using the indicating device to which the invention relates. Here it is desired to calibrate a valve 51 whose valve element 52 is normally seated against the downturned lip 53 of the casing thereof by spring 54. An actuating rod 56 is provided to unseat the valve element 52 and it is desired to calibrate and/or adjust the amount of movement of said rod to precisely control the fluid flow from the valve. The problem here of properly adjusting the valve arises from the fact that the length of the downturned lip 53 may vary materially from one valve to the next which makes the calibration and/or adjustment thereof very difficult. Here the indicating device 8 is mounted on an arm 57 which is movable toward and away from the valve. The arm is moved toward the valve until the feeler 22 reaches a position wherein one end thereof contacts the upper surface of the valve element 52 when the valve is closed, and the other end thereof abuts against blocking pin 20. As before, the slider 13 may slide within the sleeve 11 until the feeler is in the aforementioned position. Thereafter, the slider is magnetically locked in fixed position with respect to the sleeve 11 and arm 57. The feeler will follow the movement of the valve element 52 and will provide an indication on the meter of the amount of such movement, which corresponds to movement of the valve element 52 away from the lips 53, as in the other embodiments of the invention.

It will be understood that the specific details of the electrical circuit for the indicating device form no part of the present invention and that any suitable circuit elements may be used as desired or required within the scope of the invention.

While specific embodiments of the invention have been herewith utilized in order to illustrate the invention, it will be recognized that a wide variety of other specific embodiments may be devised in the light of the disclosure herein made to meet a wide variety of specific conditions and operating requirements. Accordingly, such modifications will be considered as being within the scope of the hereinafter appended claims excepting as said claims may by their own terms expressly require otherwise.

What is claimed is:

1. An indicating device for indicating the change in the distance between a workpiece and a zero reference point, comprising in combination: an elongated guide sleeve of non-magnetizable material and means for locating said sleeve at a zero reference point; an elongated soft iron slider slidable axially through the central opening of said sleeve; an electromagnet structure mounted on said sleeve, said electromagnet structure including a core, an energizing winding around said core; a first pole connected to one end of said core, a conductive yoke carrying a pair of pole pieces connected to the other end of said core, said pole pieces extending through said sleeve into sliding contact with said slider and means connecting a D.C. source to the respective ends of said energizing winding; a transducer mounted on said slider, said transducer including a housing having the windings of a differential transformer therein, said windings including a pair of axially spaced windings connected so that their outputs buck each other, a third winding located between said pair of windings and connected to an A.C. source; an elongated feeler extending through said housing and extending outwardly therefrom, a core carried on said feeler and slidable within said windings and adapted to provide a flux path between said third winding and said pair of windings; blocking means in said housing and engageable with said feeler and normally positioning same so that said core is midway between said pair of windings; spring means normally urging said feeler out of said housing; means, including an amplifier, for receiving the outputs of said pair of windings and translating same into a visual indication of the amount of movement of the feeler with respect to the housing.

2. An indicating device for indicating the change in the distance between a workpiece and a zero reference point, comprising in combination: a sleeve of non-magnetizable material and means for locating said sleeve at a zero reference point; an elongated slider of magnetizable material slidable axially through the central opening of said sleeve; an electromagnet mounted on said sleeve and having pole pieces of opposite polarity extending through said sleeve and into sliding engagement with said slider whereby said slider may be magnetized and magnetically held in fixed position with respect to said sleeve; a transducer mounted on said slider, said transducer including a housing, an elongated feeler extending into and movable within said housing, blocking means in said housing for limiting movement of said feeler thereinto so that said feeler can move in one direction into said housing to a first position therein and can move from said first position in the opposite direction out of the housing and spring means urging said feeler out of said housing, said transducer also including means for providing a zero electrical output when said feeler is in said first position and for translating movement of said feeler with respect to said housing away from said first position into an electrical output having a value corresponding to the amount of such movement; and means, including an amplifier, connected to said transducer for receiving the electrical output therefrom and translating same into an indication of the amount of such movement, said transducer also including a differential transformer within said housing, said transformer including a pair of windings connected so that the outputs thereof buck each other; a third winding connected to a source of alternating potential; said feeler having a flux linking member thereon and movable within said windings whereby upon movement of said feeler said flux linking member moves toward one and away from the other of said pair of windings; said blocking means being so positioned that when said feeler is abutting thereagainst said flux linking member is centered between said pair of windings and the outputs thereof are substantially balanced.

3. An indicating device for indicating the change in the distance between a workpiece and a zero reference point, comprising in combination: guide means; a magnetizable slider slidably guided by said guide means; a transducer including a movable feeler and electrical output means fixed to said slider for providing an electrical output proportional to amount of movement of said feeler with respect to said slider away from the zero output position thereof, a spring urging said feeler in one direction with respect to said slider; a stop engageable with said feeler for preventing same from moving in another direction opposite to said one direction beyond said zero output position; an electromagnet mounted on said guide means and having pole pieces in sliding engagement with said slider for releasably locking same in fixed position with respect to said guide means whereby said feeler may be moved against the urging of said spring against said stop so that said transducer provides a zero electrical output and said feeler and said slider may thereafter move as a unit in said other direction until the zero reference point is reached whereupon said electromagnet may be energized to lock said slider in position and said feeler is thereafter free to move with respect to said slider to provide an electrical output proportional to said change in distance.

References Cited in the file of this patent

UNITED STATES PATENTS

| | | |
|---|---|---|
| 2,458,344 | Carroll | Jan. 4, 1949 |
| 2,627,119 | Graham | Feb. 3, 1953 |
| 2,673,626 | Bastin | Mar. 30, 1954 |
| 2,833,046 | Jeglum | May 6, 1958 |